United States Patent [19]
Tokutake et al.

[11] Patent Number: 5,610,786
[45] Date of Patent: Mar. 11, 1997

[54] MAGNETIC HEAD HAVING CAO-TIO$_2$-NIO CERAMIC WITH SPECIFIED CAO/TIO$_2$ RATIO

[75] Inventors: Fusashige Tokutake; Fumio Kurosawa; Takashi Tamura; Kimio Takahashi; Kazuhiro Yagihashi; Yukari Nihei; Akira Urai, all of Miyagi, Japan

[73] Assignee: Sony Corporation, Tokyo, Japan

[21] Appl. No.: 494,569

[22] Filed: Jun. 22, 1995

[30] Foreign Application Priority Data

Jun. 28, 1994 [JP] Japan ................................. 6-146036
Aug. 24, 1994 [JP] Japan ................................. 6-199557
Dec. 29, 1994 [JP] Japan ................................. 6-340404

[51] Int. Cl.$^6$ ................................. G11B 5/255
[52] U.S. Cl. ..................... 360/122; 360/126; 428/692; 428/900; 501/123; 501/136; 501/138
[58] Field of Search .............................. 360/122, 126; 428/692, 900; 501/123, 136, 138

[56] References Cited

U.S. PATENT DOCUMENTS

| | | | |
|---|---|---|---|
| 5,168,407 | 12/1992 | Shimizu et al. | 360/103 |
| 5,290,738 | 3/1994 | Tomishima et al. | 501/104 |
| 5,296,312 | 3/1994 | Kanai et al. | 428/702 |
| 5,404,259 | 4/1995 | Ishiwata et al. | 360/122 |

FOREIGN PATENT DOCUMENTS

0510690A2 10/1992 European Pat. Off.
4235874A1 5/1993 Germany.

OTHER PUBLICATIONS

Database WPI, Section Ch, Week 8607, Derwent Publications Ltd., London, GB; Class L03, AN86-045735 & JP-A-60 264 363 (TDK Corp.), Dec. 27, 1985, Abstract.
International Magnetics Conference (Intermag '92), St. Louis, Mo., Apr. 13–16, 1992, vol. 28, No. 5, Pt. 2, ISSN 0018–9464, IEEE Transactions on Magnetics, Sep., 1992, USA, pp. 2118–2110, XP000570734, N. Ishiwata, et al: "High Abrasion Resistance Laminated Sendust VR Heads".
Proceedings of the International Magnetics Conference (Intermag), St. Louis, Apr. 13–16, 1992, IEEE, p. AA12 X000341712, Nobuyuki Ishiwata, et al.: "High Abrasion Resistive Laminated Sendust Heads".

*Primary Examiner*—Stevan A. Resan
*Attorney, Agent, or Firm*—Hill, Steadman & Simpson

[57] ABSTRACT

A non-magnetic material for a magnetic head and a magnetic head produced with the use of such material. For improving the head efficiency and resistance against partial abrasion, the guard piece 11 is mainly composed of CaO, TiO$_2$ and NiO, with the molar mixing ratio CaO/TiO$_2$ being 30/70 to 50/50 and the NiO content being 5 to 30 mol %. The head efficiency may be improved, while the partial abrasion may be decreased and the service life of magnetic head may be improved sufficiently.

6 Claims, 6 Drawing Sheets

MAGNETIC HEAD HAVING CAO-TIO$_2$-NIO CERAMIC WITH SPECIFIED CAO/TIO$_2$ RATIO

BACKGROUND OF THE INVENTION

This invention relates to a magnetic head employed for high-density recording of speech signals, picture signals or information signals, as magnetic signals, on a recording track of a magnetic recording medium, such as a magnetic tape, in e.g., a video tape recorder (VTR), a digital audio tape recorder (DAT) or a digital data recording device, with high recording density. The invention also relates to a magnetic material for a magnetic head employed therein.

A magnetic recording and/or reproducing apparatus, such as VTR or DAT, employing a magnetic recording tape or the like as a magnetic recording medium, has a magnetic head for reading out or reproducing information signals from a signal recording surface of the magnetic recording tape, and/or writing or recording information signals on the signal recording surface, for reading and/or recording the information signals on or from the magnetic recording medium.

The magnetic head includes a magnetic core and a member wound thereon, such as a coil. A magnetic gap, which is a small interstice, is formed in the magnetic core. The coil plays the role of transmitting information signals as magnetic flux to the magnetic core for recording or reproduction.

On the other hand, the magnetic core plays the role of transmitting the magnetic flux from the coil to the magnetic recording medium and vice versa for recording and reproduction, respectively. The magnetic gap acts for limiting the spreading of the magnetic field for recording information signals, while acting as a magnetic flux intake opening from the magnetic recording medium during reproduction.

Recently, the tendency is towards recording or reproducing signals of shorter wavelengths for recording or reproducing more information signals with a view to improving the quality of picture signals to be recorded or reproduced, or to increasing the storage capacity. To this end, a high coercivity magnetic recording medium, such as a metal tape in which magnetic metal powders, that is magnetic powders employed for a magnetic layer of the magnetic recording medium, are coated on a base film, or a vaporized tape, in which a magnetic metal material is directly deposited on the base film by vapor deposition, is being used in increasing numbers.

For enabling recording or reproduction on or from such high coercivity magnetic recording medium, proposals have been made of a layered magnetic head in which a magnetic layer of a metal having high magnetic permeability and high saturation flux density, such as iron-based alloy, iron-nickel based alloy or an iron-cobalt based alloy, is used as a magnetic core material for a magnetic head, or a so-called metal-in-gap (MIG) magnetic head.

The layered magnetic head has magnetic core halves each formed by a magnetic metal layer sandwiched between a pair of guard pieces. The magnetic core halves are abutted to each other and unified together by glass fusion to complete a unified structure of the magnetic head.

The present inventors have proposed such a layered magnetic head in which magnetic metal films constituting the magnetic core are magneto-statically connected to each other at both ends for improving the efficiency of the magnetic head especially in a high frequency range.

With the above-described layered magnetic head employing the magnetic metal material for the magnetic core material for effecting high-density recording, since the magnetic metal layer is worn out more severely than the non-magnetic guard material by contact with the magnetic tape, the magnetic metal layer of the magnetic core is worn out more quickly than other portions, as a result of which the magnetic core portion is receded due to partial abrasion. With the layered magnetic head, there is generated an interstice between the magnetic gap and the magnetic recording medium, and the magnetic field intensity of the magnetic gap with respect to the magnetic recording medium is lowered, so that the electro-magnetic conversion characteristics are lowered especially in the high frequency range.

Such partial abrasion may be diminished by employing a magnetic metal layer-guard material combination exhibiting similar values of the amount of wear with respect to the magnetic tape. However, there lacks up to now a magnetic metal material having abrasion resistance affording practically acceptable durability of the magnetic head and sufficient magnetic properties. For this reason, if the partial abrasion is to be diminished, one has to select a guard material having a significant amount of abrasion with respect to the magnetic recording medium in order to match the properties of the guard material to those of the magnetic core material. If, solely in this consideration, a guard material having significant amount of wear with respect to the magnetic tape is selected, the resulting magnetic head is poor in durability since it exhibits significant abrasion by contact with the magnetic tape, even although it undergoes only little partial abrasion.

Thus an MnO-NiO based non-magnetic material as disclosed in U. S. Pat. Nos. 4,805,059 or 5,057,374 and in JP Patent Kokai Publication JP-A-2-296765, or a CaO-TiO$_2$-NiO non-magnet material, as disclosed in JP Patent Publication JP-B-3-45024 or JP patent Kokai Publication JP-A-6-28807, have been proposed as a non-magnetic material for a magnetic head.

The MnO-NiO based non-magnetic material, while having a thermal expansion coefficient comparable with the magnetic metal film, has a significant value of abrasion with respect to the magnetic tape.

On the other hand, the CaO-TiO$_2$-NiO non-magnet material, as disclosed in JP Patent Publication JP-B-3-45024, is composed of 3 to 35 mol % of CaO, 3 to 30 mol % of TiO$_2$ and 60 to 90 mol % of NiO, has a thermal expansion coefficient comparable to the magnetic metal film, and exhibits an extremely small value of abrasion with respect to the magnetic tape. However, the nonmagnetic material suffers from a significant difference in the amount of wear from that of the magnetic metal film with respect to the magnetic tape, that is partial abrasion.

SUMMARY OF THE INVENTION

In view of the foregoing, it is an object of the present invention to provide a magnetic material for a magnetic head having a thermal expansion coefficient close to that of the magnetic metal film and exhibiting a superior balance between partial abrasion and abrasion with respect to the magnetic tape.

It is another object of the present invention to provide a magnetic head having high head efficiency and a sufficient service life as a magnetic head and also suffering from less partial abrasion.

According to the present invention, there is provided a non-magnetic material for a magnetic head composed of CaO, $TiO_2$ and NiO, with the amounts of CaO, $TiO_2$ and NiO being 15 to 45 mol %, 40 to 80 mol % and 5 to 30 mol %, respectively.

Preferably, the CaO—$TiO_2$ molar ratio CaO/$TiO_2$ is 30/70 to 50/50.

If the proportion of CaO in the molar ratio CaO/$TiO_2$ is less than 30, that is if the proportion of $TiO_2$ is larger than 70, the head efficiency is lowered. In addition, if the content of CaO is less than 15 mol % and the content of $TiO_2$ exceeds 80 mol %, the thermal expansion coefficient of the non-magnetic material becomes significantly lower than that of the magnetic metal film.

On the other hand, if the proportion of CaO in the molar ratio CaO/$TiO_2$ is larger than 50, that is if the proportion of $TiO_2$ is less than 50, CaO precipitation is incurred and sinterability is deteriorated. If the content of CaO exceeds 45 mol % and the content of $TiO_2$ is less than 40 mol %, numerous pores are produced in the non-magnetic material.

According to the present invention, there is also provided a magnetic head having magnetic core halves each including a magnetic metal film sandwiched between a pair of guard pieces, wherein the above-mentioned non-magnetic material for the magnetic head is employed as main component material of the guard pieces. The magnetic core halves are abutted with end faces of the magnetic metal films facing each other, with a magnetic gap being defined between abutting surfaces of the magnet metal films.

The guard pieces may be formed by a composite substrate formed by jointing two or more materials. In this case, it is necessary for part or all of the sliding surface thereof with a magnetic recording medium to be composed mainly of CaO, $TiO_2$ and NiO, with the content of NiO being 5 to 30 mol %.

For improving the head efficiency, the magnetic metal film may be laminated magnetic films including plural unitary laminated magnetic films deposited with insulating films in-between, each unitary laminated magnetic film being made up of alternately laminated magnetic and non-magnetic films.

Preferably, the magnetic films are mainly composed of Co and contain a least one of elements Zr, Mo, Nb, Ta, Ti, Hf and Pd.

Specifically, the magnetic films may also be mainly composed of Fe and contain a least one of elements Ru, Ga, Si, O and N.

The magnetic films may also be formed using an amorphous alloy consisting of one or more of elements Fe, Ni and Co and one or more of elements P, C, B and Si, a metal-metalloid based amorphous alloy, such as an alloy mainly composed of the above elements and also containing Al, Ge, Be, Sn, In, Mo, W, Ti, Mn, Cr, Zr, Hf or Nb, or a metal-metal based amorphous alloy mainly composed of transition elements such as Co, Hf or Zr or rare earth elements.

The non-magnetic material for a magnetic head, composed of CaO, $TiO_2$ and NiO, with the amounts of CaO, $TiO_2$ and NiO being 15 to 45 mol %, 40 to 80 mol % and 5 to 30 mol %, respectively, has a thermal expansion coefficient substantially equal to that of the magnetic metal film, while being superior in the balance between the amount of abrasion and the amount of partial abrasion with respect to the magnetic tape.

In addition, since the guard material is formed mainly of the above-mentioned magnetic material for the magnetic head, the head efficiency may be improved, while the partial abrasion may be decreased and the service life of magnetic head may be improved sufficiently.

On the other hand, since the guard material sandwiching the magnetic metal film in the magnetic head of the present invention is mainly formed of a non-magnetic material for the magnetic head, the amount of abrasion of the non-magnetic substrate with respect to the magnetic recording medium may be optimally balanced with the amount of abrasion of the magnetic metal layer as the magnetic core with respect to the magnetic recording medium. The result is that the magnetic head undergoes only small partial abrasion between the magnetic core and the guard material when the magnetic core is in sliding contact with the magnetic recording medium, such that the magnetic head exhibits superior durability and high magnetic head efficiency.

DETAILED DESCRIPTION OF PREFERRED EMBODIMENTS

The present invention will be explained with reference to several Examples. It is noted that the present invention is not limit&d by these Examples which are given only by way of illustration. First, Example 1 is now explained based upon experimental results.

EXAMPLE 1

Experiment 1

First, the effect of the amount of NiO in the non-magnetic material on the non-magnetic material for the magnetic head and on partial abrasion of a magnetic head produced from the nonmagnetic material was checked.

Preparation of Sample

A non-magnetic material for a magnetic head was produced with a constant mixing molar ratio of CaO and $TiO_2$ or CaO/$TiO_2$ of 45/55 and with the amount of NiO changed from 0 mol % to 80 mol %.

First, $CaCO_3$ powders, $TiO_2$ powders and NiO powders, available commercially, were weighed out in suitable amounts to give the above composition, and admixed with pure water. The resulting mixture was wet-mixed in a ball mill for 24 hours. The resulting mass was dried at 100° C.

for longer than 24 hours and roughly crushed with Ishikawa type crusher. The resulting mass was calcined at 110° C. for five hours. The calcined powders were then crushed with the Ishikawa type crusher.

The resulting powders were again admixed with pure water and wet-mixed for 24 hours in a ball mill. The resulting wet mixture was dried at 100° C. for 20 hours, and crushed with the Ishikawa type crusher. The resulting powders were admixed with a 10 wt % aqueous solution of polyvinyl alcohol (PVA) in an amount which accounts for 10 wt % of the weight of the total powders, and the resulting mixture was granulated.

The resulting granules were press-molded at 80 MPa and sintered in oxygen at a temperature of 1250° to 1400° C. The sintered product was then processed with hot isostatic pressing (HIP processing) at 1150° to 1350° C. under a pressure of 100 MPa exerted by Ar.

Preparation of Magnetic Head

Magnetic head samples were prepared using non-magnetic materials prepared as described above with different NiO contents. The magnetic heads prepared in the present experimental example were layered magnetic heads.

Figure 1:
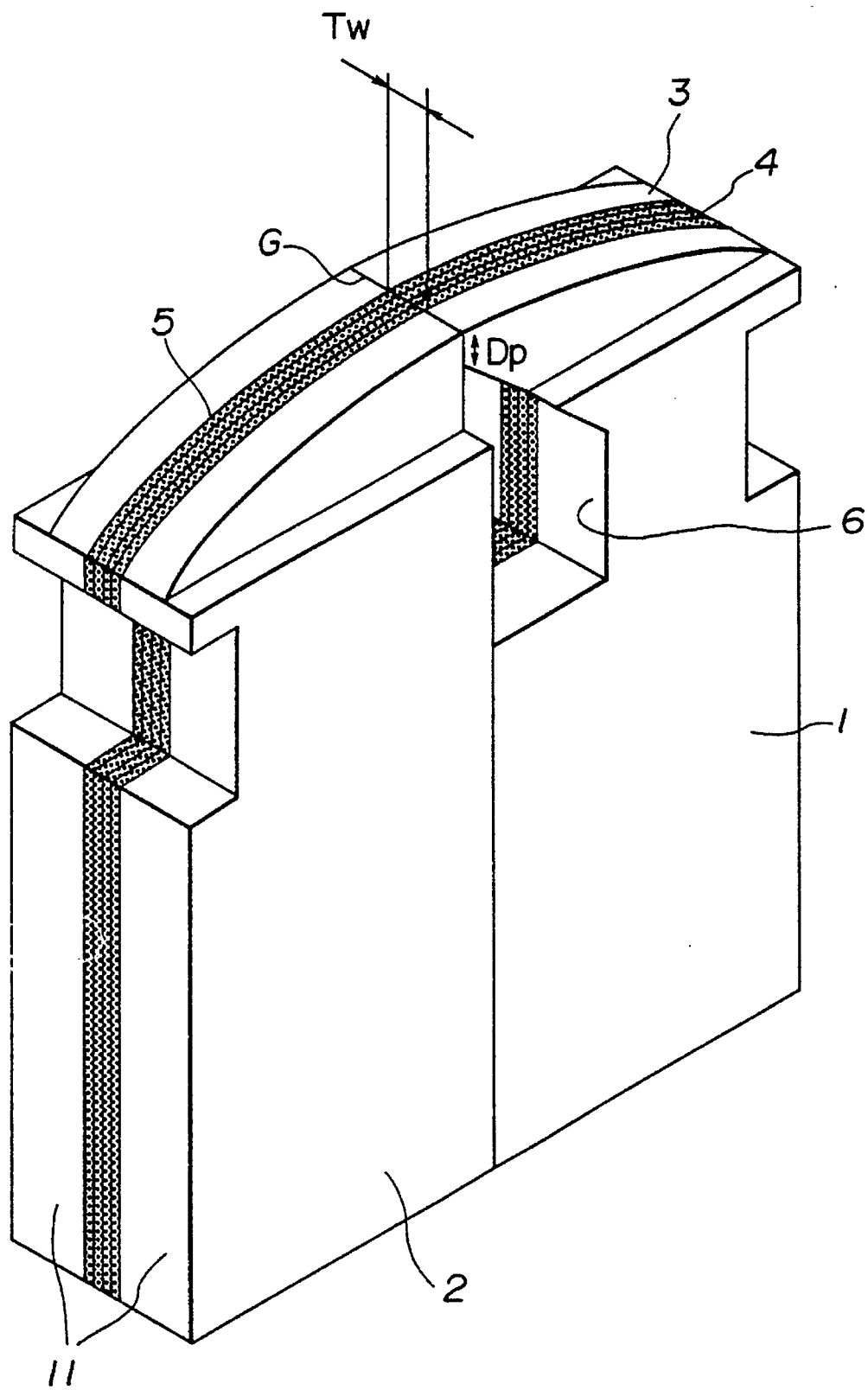
FIG. 1 is a schematic perspective view showing the construction of a magnetic head according to an embodiment of the present invention.

In such magnetic head, a pair of magnetic core halves 1, 2 constituting a closed magnetic circuit are abutted to each other as shown in FIG.1. A magnetic gap G is formed in a surface 3 configured to have a sliding contact with a magnetic recording medium, not shown.

Each of the magnetic core halves 1, 2 is made up of guard pieces 11 and laminated magnetic films 4 and 5. On the abutment surfaces of the magnetic core halves 1 and 2, the laminated magnetic films 4 and 5 are abutted to each other at end faces thereof for defining a magnetic gap G. The track width Tw of the magnetic gap G is governed by film thicknesses of the laminated magnetic films 4 and 5 since the guard pieces 11 are of a non-magnetic material. Adjacent to the abutting surface of the magnetic core halves 1 and 2 is formed a window for winding 8 for determining the depth Dp of the magnetic gap G and for placing a coil, herein not shown.

Each of the layered magnetic films 4 and 5 is preferably made up of a unit of laminated magnetic films 23 laminated with an insulating film 24. The unit of laminated magnetic films 11 is made up of alternately layered magnetic films 21 and non-magnetic films 22. In the present Example 1, the magnetic film 21 was a CoZrNbTa amorphous film with a film thickness of 241 nm, the non-magnetic film 22 was a $SiO_2$ film with a film thickness of 10 nm, and the insulating film 24 was a $SiO_2$ film with a film thickness of 200 nm. Eight units of the laminated films 23 were layered, with the total thickness of 2 μm. Nine layers of the layered magnetic films 4, 5 were formed, with the total film thickness being 19.6 μm. The magnetic head was of a size of 2 mm in width, 2 mm in height and 0.2 mm in thickness, with the track width of 19.6 μm and the abutment width with a radius of curvature of 8 mm.

Measurement of Abrasion and Partial Abrasion

Each magnetic head constructed as described above was loaded on a VTR manufactured by SONY CORPORATION under the trade name of BVE-50 so that an protruding length of the magnetic head from a drum was 30 μm. Two sorts of video tapes manufactured by SONY CORPORATION under the trade name of BCT-90ML and BCT-90MLA, referred to herein as tape A and tape B, respectively, were caused to slide in contact with the magnetic heads for 100 hours under conditions of 30° C. and 80% RH.

Figure 3:
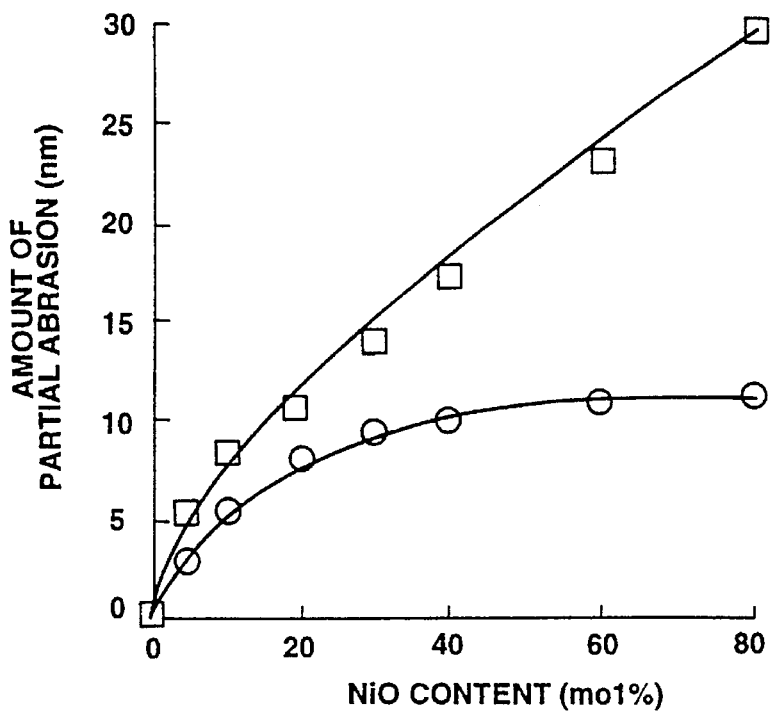
FIG. 3 is a graph showing the relation between the NiO content and the amount of partial abrasion in Example 1.

The amount of abrasion of the magnetic head, indicated by changes in the protruding length, and the amount of partial abrasion between the guard piece and the laminated magnetic films in the gap region, were checked and evaluated. The relation between the Ni content and the amount of partial abrasion after sliding of the tapes A and B is shown in FIG. 3, in which 0 and □ indicate the results obtained for the tapes A and B, respectively. In a layered magnetic head, partial abrasion generally means separation loss approximately represented by the following equation:

$$\text{Separation Loss} = 54.6 d/\lambda \, (\text{dB}) \qquad (1)$$

where d is the partial abrasion and λ is the recording wavelength. It is seen from this equation that the larger the partial abrasion d, the lower is an output especially in the short wavelength range or high-frequency range, so that the partial abrasion not more than 15 μm is preferred.

Figure 4:
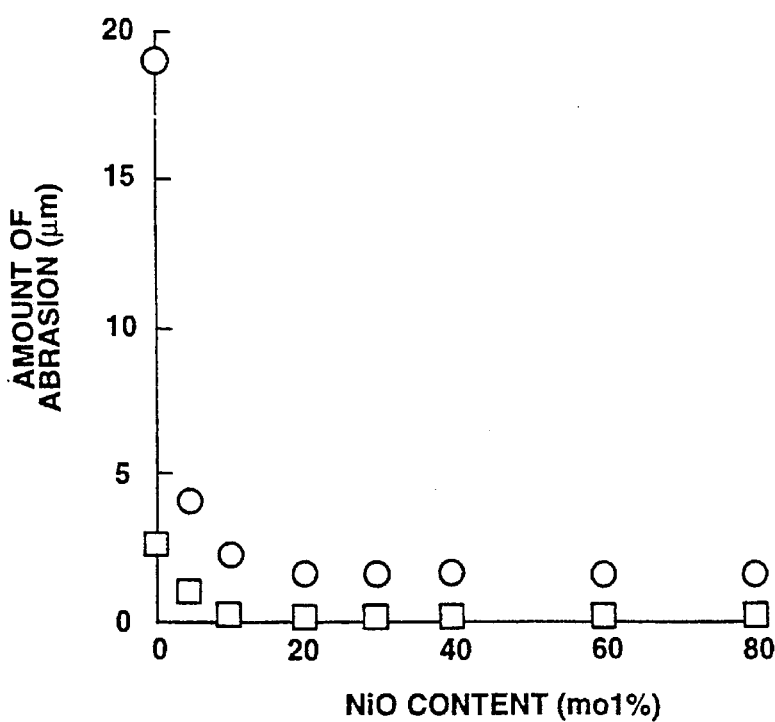
FIG. 4 is a graph showing the relation between the NiO content and the amount of abrasion in Example 1.

The relation between the NiO content and the amount of abrasion after sliding of the tapes A and B in contact with the magnetic heads is shown in FIG. 4, in which 0 and □ again indicate the results obtained for the tapes A and B, respectively. A higher value of the resistance against abrasion is naturally preferred since the larger amount of abrasion leads to shortened service life of the magnetic head.

If, from these results, the balance between the amount of abrasion and the amount of partial abrasion is evaluated comprehensively, it is found that the non-magnetic material having the NiO content in a range of from 5 mol % to 30 mol % is preferred as the guard material.

Experimental Example 2

The relation between the CaO and $TiO_2$ amounts in the non-magnetic material on one hand and the state of pores and the thermal expansion coefficient on the other hand was checked. Preparation of Samples $CaCO_3$ powders, $TiO_2$ powders and NiO powders, commercially available, are suitably weighed out to give compositions of samples Nos.1 to 32 shown in Table 1, in order to prepare 32 sorts of sample powder mixtures. Each of the powder mixtures was admixed with pure water and wet-mixed for 24 hours in a ball mill.

TABLE 1

| Sample No. | Composition (mol %) | | | Pore State | Thermal Expansion Coefficient ($\times 10^{-7}$/°C.) |
|---|---|---|---|---|---|
| | CaO | TiO2 | NiO | | |
| 1 | 10 | 85 | 5 | o | 97 |
| 2 | 15 | 80 | 5 | o | 100 |
| 3 | 20 | 75 | 5 | o | 103 |
| 4 | 30 | 65 | 5 | o | 109 |
| 5 | 40 | 55 | 5 | o | 113 |
| 6 | 45 | 50 | 5 | o | 116 |
| 7 | 50 | 45 | 5 | x | — |
| 8 | 60 | 35 | 5 | x | — |
| 9 | 10 | 80 | 10 | o | 97 |
| 10 | 15 | 75 | 10 | o | 100 |
| 11 | 20 | 70 | 10 | o | 103 |
| 12 | 30 | 60 | 10 | o | 108 |
| 13 | 40 | 50 | 10 | o | 113 |
| 14 | 45 | 45 | 10 | o | 121 |
| 15 | 50 | 40 | 10 | x | — |
| 16 | 60 | 30 | 10 | x | — |
| 17 | 10 | 70 | 20 | o | 97 |
| 18 | 15 | 65 | 20 | o | 100 |
| 19 | 20 | 60 | 20 | o | 102 |
| 20 | 30 | 50 | 20 | o | 108 |
| 21 | 40 | 40 | 20 | o | 123 |

TABLE 1-continued

| Sample No. | Composition (mol %) | | | Pore State | Thermal Expansion Coefficient ($\times 10^{-7}/°C$) |
| --- | --- | --- | --- | --- | --- |
| | CaO | TiO2 | NiO | | |
| 22 | 45 | 35 | 20 | x | — |
| 23 | 50 | 30 | 20 | x | — |
| 24 | 60 | 20 | 20 | x | — |
| 25 | 10 | 60 | 30 | ○ | 96 |
| 26 | 15 | 55 | 30 | ○ | 100 |
| 27 | 20 | 50 | 30 | ○ | 102 |
| 28 | 30 | 40 | 30 | ○ | 118 |
| 29 | 40 | 30 | 30 | x | — |
| 30 | 45 | 25 | 30 | x | — |
| 31 | 50 | 20 | 30 | x | — |
| 32 | 60 | 10 | 30 | x | — |

The sample powder mixtures were then dried at 100° C. for longer than 20 hours and roughly crushed with the Ishikawa type crusher. The resulting product was calcined at 100° C. for five hours. The calcined powders were then crushed with the Ishikawa type crusher.

The resulting powders were again admixed with pure water and wet-mixed for 24 hours in a ball mill. The resulting wet mixture was dried at 100° C. for 20 hours, and crushed with the Ishikawa type crusher. The resulting powders were admixed with a 10 wt % aqueous solution of polyvinyl alcohol (PVA) in an amount which accounts for 10 wt % of the weight of the total powders, and the resulting mixture was granulated.

The resulting granules were press-molded at 80 MPa and sintered in oxygen at a temperature of 1250° to 1400° C. The sintered product was then processed with hot isostatic pressing (HIP processing) at 1150° to 1350° C. under a pressure of 100 MPa exerted by Ar to produce samples Nos. 1 to 32.
Measurement of the Pore State and Thermal Expansion Coefficient The state of pores and the thermal expansion coefficient were evaluated of the produced non-magnetic materials of the samples Nos. 1 to 32 having respective molar ratios. The results are also shown in Table 1.

In the results of evaluation of the pore state, shown in Table 1, ○ and X marks respectively denote the state in which the pore ratio is not more than 0.1% and the state in which there are numerous pores such that densification by HIP processing is not possible.

It is seen from the results of Table 1 that, if the CaO content exceeds 45 mol % and TiO$_2$ content is less than 40 mol %, as in the cases of the samples Nos. 7, 8, 15, 18, 22, 23, 24, 29, 30, 31 and 32, the results of the pore states are poor such that the densification by HIP processing is not feasible and there are left numerous pores which renders the samples unsuitable as the guard materials for the magnetic heads.

It is also seen from the results of Table 1 that samples containing CaO in an amount less than 15 mol % or containing TiO$_2$ in an amount exceeding 80 mol %, such as samples Nos. 1, 9, 17 or 25, are not suitable for the guard material for the magnetic head, since the thermal expansion coefficient then is lower than $100 \times 10^{-7}/°C$. which is significantly lower than that of the magnetic metal film.

These results indicate that the state of pores and the thermal expansion coefficient are satisfactory if the proportions of CaO and TiO$_2$ are in the ranges of from 15 to 45 mol % and 40 to 80 mol %, respectively.

Thus the results of the Experimental Examples 1 and 2 reveal that the non-magnetic material for magnetic heads composed of CaO, TiO$_2$ and NiO and having the composition of 15 to 45 mol % of CaO, 40 to 80 mol % of TiO$_2$ and 5 to 30 mol % of NiO has a low pore ratio and a thermal expansion coefficient substantially equal to that of a magnetic metal material, and exhibits optimum balance between the amount of abrasion with respect to a magnetic tape and the amount of partial abrasion.

Although the description of this Example has been made of a target material of the composition of $Co_{81}Zr_4Nb_{12}Ta_3$ in atomic percent, employed for sputtering, similar effects to those described above may also be obtained if the formed film is represented by the formula of $CO_aZr_bNb_cTa_d$, where a to d represent the proportions of elements in atomic percent, with the composition being such that $79 \leq a \leq 83$, $2 \leq b \leq 6$, $10 \leq c \leq 14$ and $1 \leq d \leq 5$.

The magnetic metal films 6 and 7 may also be an amorphous alloy containing one or more of elements Fe, Ni and Co and one of more of elements P, C, B and Si, a metal-metalloid based amorphous alloy, such as an alloy mainly composed of the above elements and also containing Al, Ge, Be, Sn, In, Mo, W, Ti, Mn, Cr, Zr, Hf or Nb, or a metal-metal based amorphous alloy mainly composed of transition elements such as Co, Hf or Zr or rare earth elements, in addition to the above-mentioned CoZrNbTa amorphous alloy.

Although the laminated magnetic films 4 and 5 are formed in the present Example by a dc magnetron sputtering device and a high frequency sputtering device, similar effects to those described above may also be obtained by other devices excellent in film thickness controlling properties, using the vacuum thin film forming techniques, such as sputtering, vacuum deposition, ion plating or ion beam methods. Furthermore, although the guard material in the above Example 2 is formed by the non-magnetic substrate 11 mainly composed of CaO, TiO$_2$ and NiO with the amount of NiO being 5 to 30 mol %, similar effects to those described above may also be obtained if the guard piece 11 is designed as a composite substrate formed of plural layers of two or more materials joined together.

Figure 5:
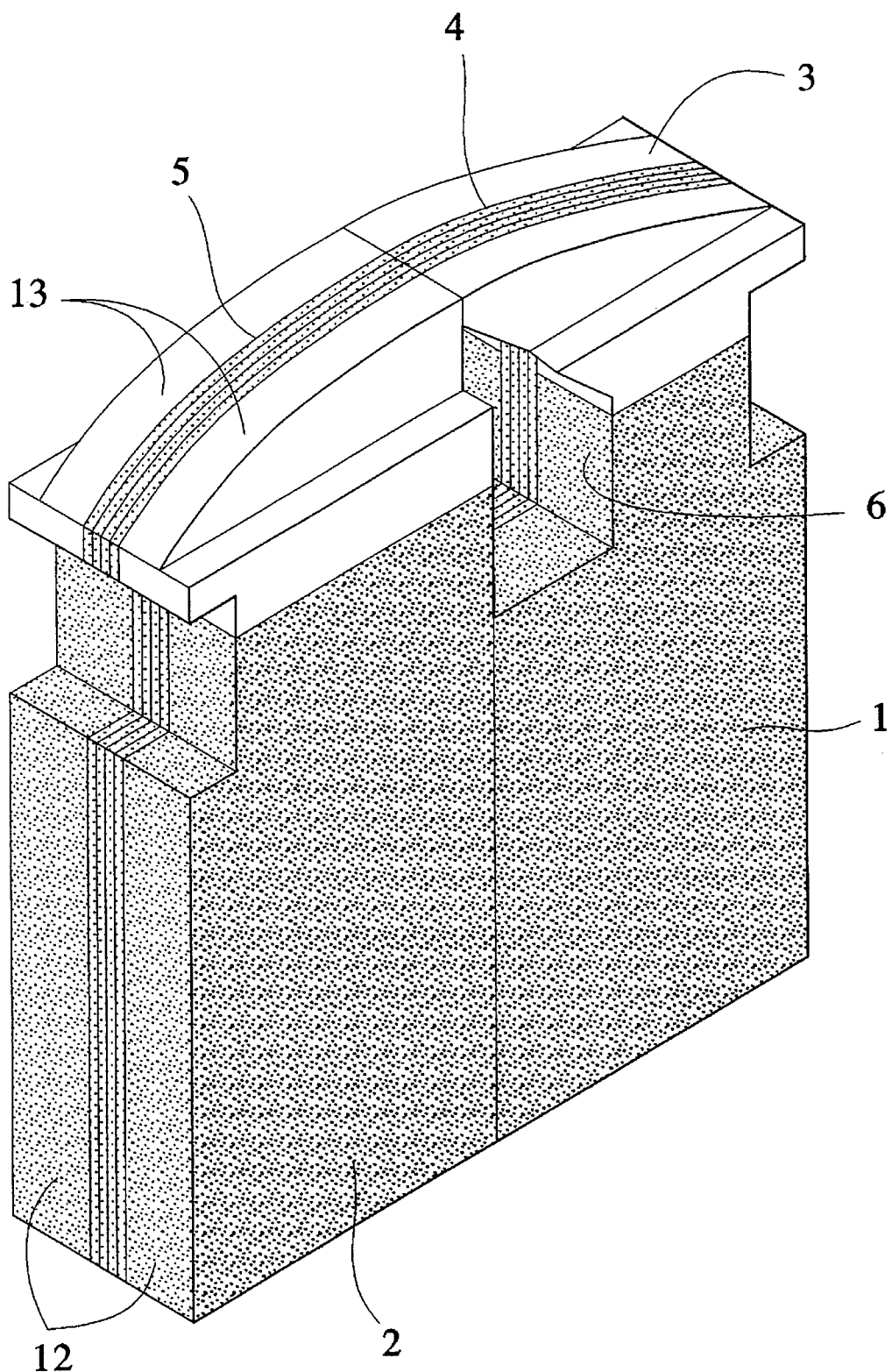
FIG. 5 is a schematic perspective view showing the construction of a magnetic head according to another embodiment of the present invention.
Figure 6:
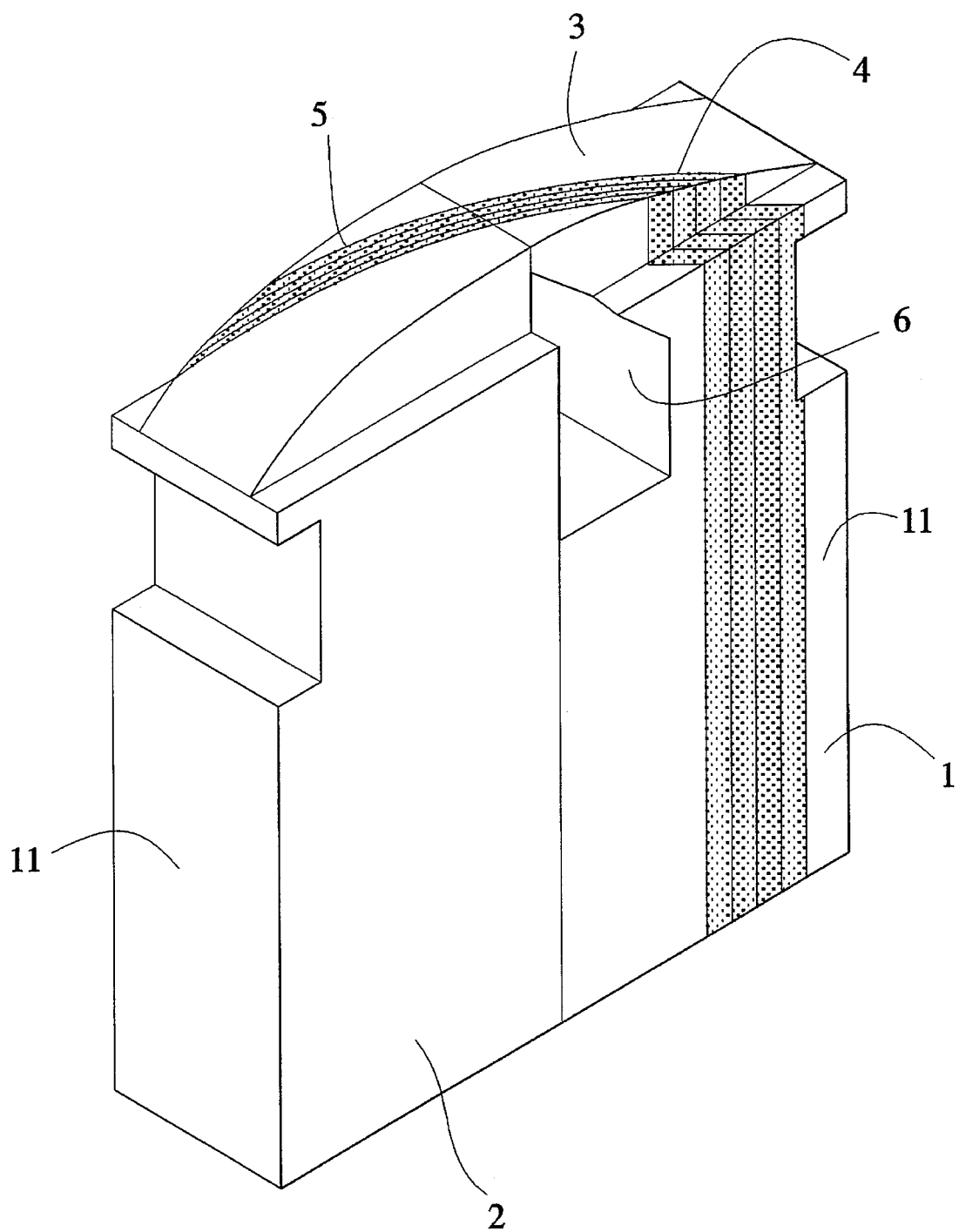
FIG. 6 is a schematic perspective view showing the construction of a magnetic head according to still another embodiment of the present invention.

FIG. 5 shows the construction of a magnetic head employing a composite material of different materials joined together on the front gap side and the back gap side. A non-magnetic substrate 13 mainly composed of CaO, TiO and NiO with the NiO content ranging from 5 to 30 mol %, similarly to the guard material 11, is mounted on the front gap which is in sliding contact with the magnetic recording medium. On the other hand, a magnetic substrate 12 formed of e.g., magnetic ferrite is mounted on the back gap side.

The effects similar to those described above may also be achieved if the laminated magnetic films 4 and 5 are arranged with a pre-set azimuth angle instead of at a position perpendicular to the magnetic gap G.

EXAMPLE 2

The Example 2 will be explained based upon experimental results.

Experimental Example 1

In the present experiment, the effect the amount of NiO in the non-magnetic material for the magnetic head has on the amount of abrasion of the magnetic material for the magnetic head and on the partial abrasion of a magnetic head prepared from the material was checked.

A non-magnetic material for a magnetic head was produced with a constant mixing molar ratio of CaO and TiO$_2$ or CaO/TiO$_2$ of 45/55 and with the amount of NiO changed from 0 mol % to 80 mol %, in the same way as in Example 1.

Preparation of Magnetic Head

Figure 2:
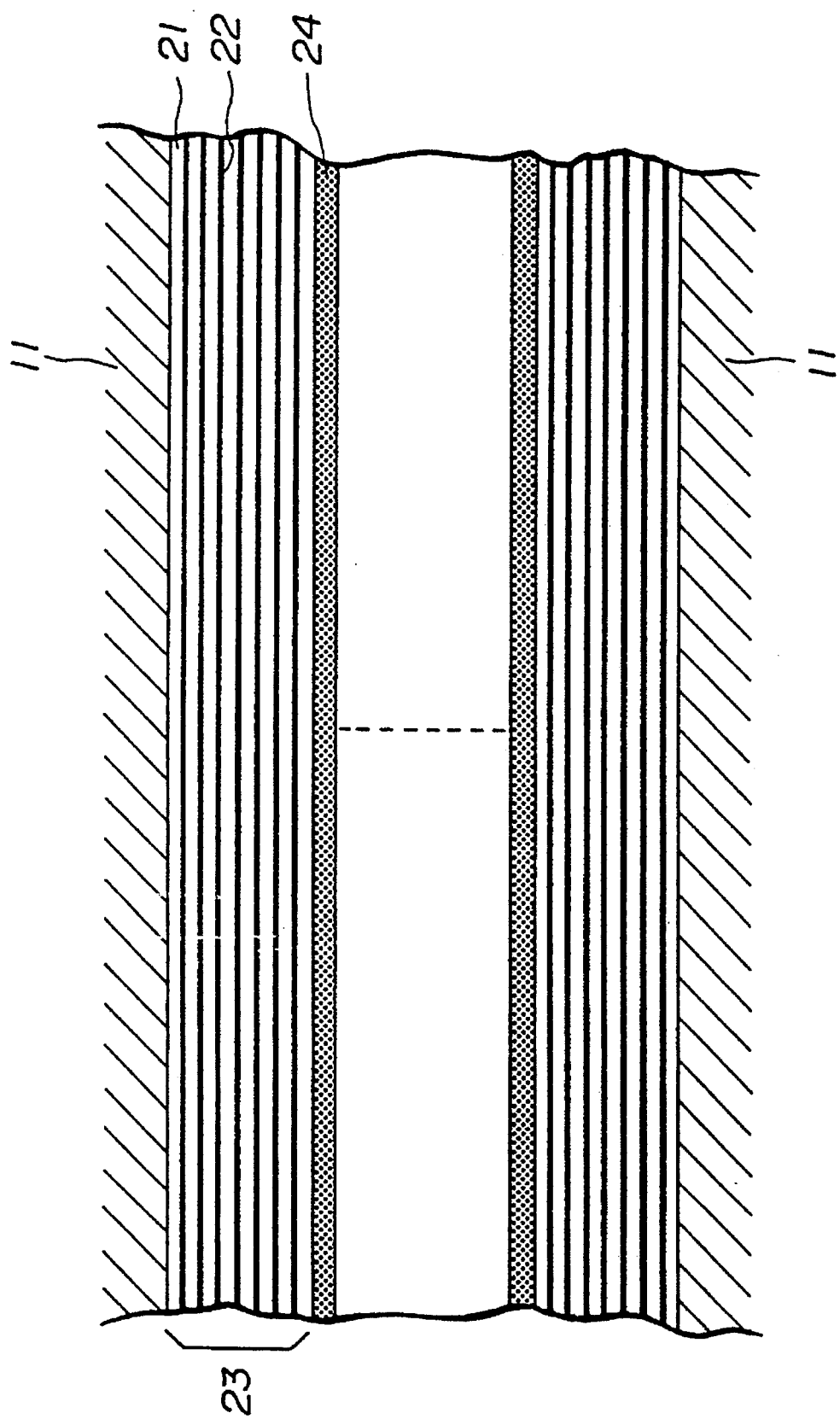
FIG. 2 is a schematic view showing a layered magnetic film.

Using the non-magnetic materials containing different amounts of NiO, prepared in the same way as in Example 1, samples of the magnetic head shown in FIGS. 1 and 2 were prepared. The magnetic heads prepared in the present experimental example were layered magnetic heads, as in Example 1.

In the present Example 2, a FeRuGaSi alloy film with a film thickness of 3 μm, a SiO$_2$ film with a film thickness of 10 nm and a SiO$_2$ film with a film thickness of 200 nm were used as a magnetic film 21, a non-magnetic film 22 and an insulating film 24, respectively, as shown in FIG. 2. Six layers of unit laminated film 23 were formed, with the total film thickness being 19 μm.

The magnetic film 21 was formed by a dc magnetron sputtering device, using a target material having the composition of $Co_{81}Zr_4Nb_{12}Ta_3$ in terms of atomic percent, under conditions of a power density of 5.0 W/cm$^2$, an Ar gas pressure of 0.4 Pa and a distance between electrodes of 100 mm. The non-magnetic film 22 and a SiO$_2$ film, as the insulating film 24, were formed using a high-frequency sputtering device under conditions of a power density of 3.0 W/cm$^2$, an argon gas pressure of 0.4 Pa and a distance between electrodes of 100 mm.

For this test for resistance against abrasion, a magnetic head 2 mm in width by 2 mm in height by 0.2 mm in thickness, with a track width of 19 μm, an abutment width of 70 μm and an end R of 5 mm, having a construction as shown in FIG. 1, was employed. Measurement of the Amount of Abrasion and Partial Abrasion The magnetic head having the above construction was loaded on a video tape recorder (VTR) with a protruding distance of the head from the drum of 30 μm, and two sorts of magnetic tapes (the above-mentioned tapes A and B) as the magnetic recording media were caused to run under conditions of 30° C. and 80% RH. The amount of abrasion of the magnetic head (change in the protruding distance) of the magnetic head and the partial abrasion between the guard material and the magnetic metal films in the vicinity of the magnetic gap G were checked and evaluated.

Figure 7:
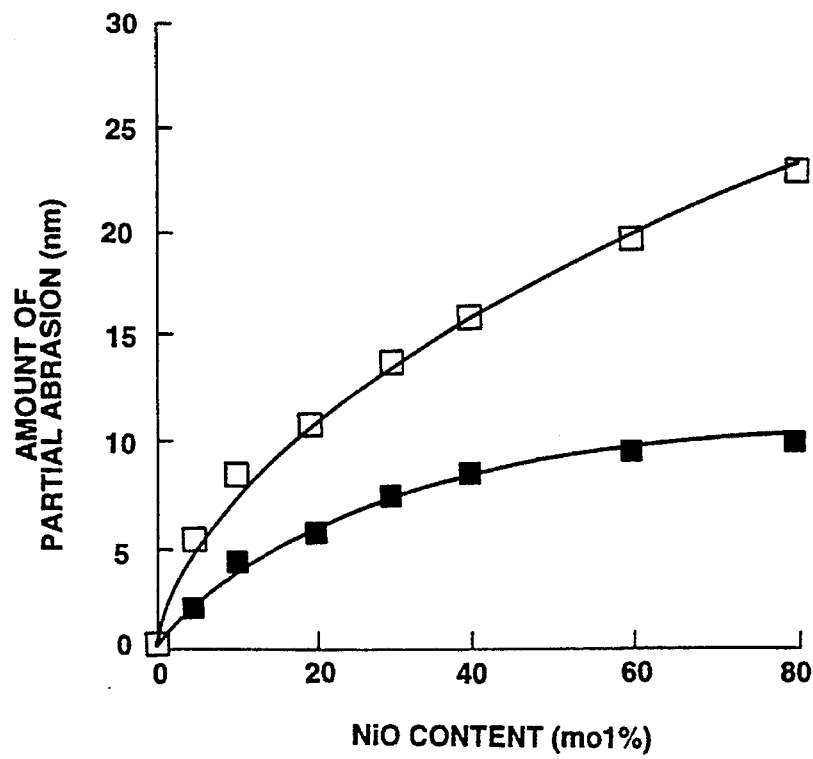
FIG. 7 is a graph showing the relation between the NiO content and the amount of partial abrasion in Example 3.

The amount of abrasion of the magnetic head (change in protruding distance) and partial abrasion between the guard material and the laminated magnetic films at this time were checked and evaluated. The relation between the amount of NiO and the amount of partial abrasion after sliding of the tapes A and B in contact with the magnetic head is shown in FIG. 7, in which ■ and □ indicate the results for the tape A and B, respectively. With the layered magnetic head, such as that described above, partial abrasion in general is the separation loss substantially represented by the above equation (1). It is seen from this equation that, if the amount of partial abrasion is increased, the output, is lowered especially in the short wavelength range (high frequency range). Consequently, the amount of partial abrasion is preferably not more than 15 nm.

Figure 8:
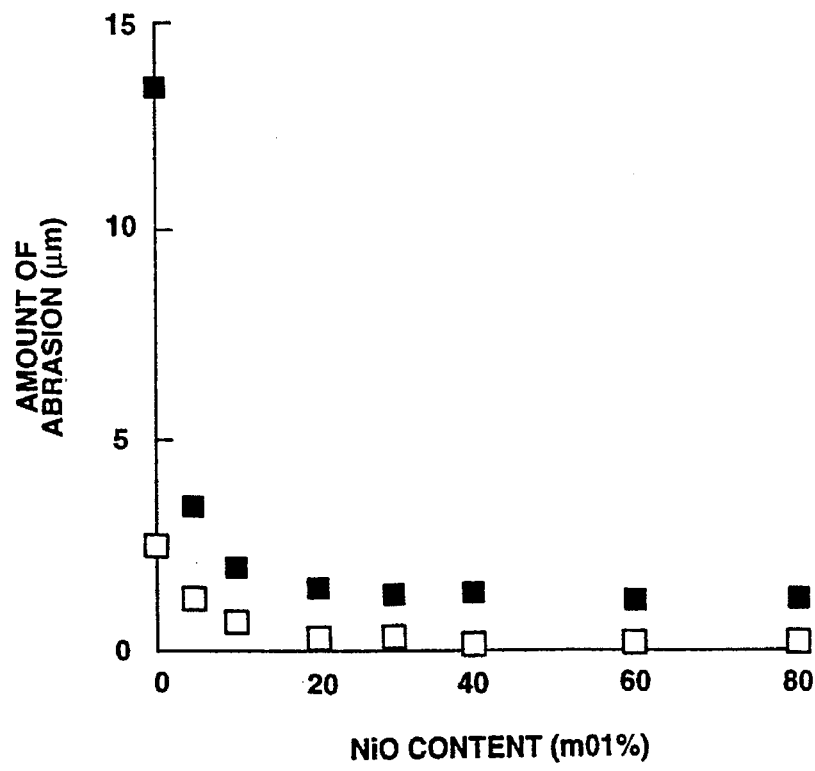
FIG. 8 is a graph showing the relation between the NiO content and the amount of abrasion in Example 3.

The relation between the NiO content and the amount of abrasion caused after sliding of the tapes A and B in contact with the magnetic head is shown in FIG. 8, in which ■ and □ indicate the results for the tape A and B, respectively. A higher value of the resistance against abrasion is naturally preferred because a larger value of the amount of abrasion leads to a shortened service life of the magnetic head.

If comprehensive evaluation of the balance of the amount of abrasion and the amount of the partial abrasion is given based upon the above results, it is seen that a non-magnetic material having the Ni content of 5 to 30 mol % is suitable as the guard material.

Experiment 2

The self-recording/reproducing characteristics of the magnetic head in case the NiO content was fixed at 10 mol % and 30 mol % and the CaO-TiO$_2$ mixing ratio CaO/TiO$_2$ was changed in a range form 10/90 and 55/45 were then checked.

A comparison output in this case is a relative value when an output of the magnetic head for the Ni content of 10 mol % and the molar mixing ratio CaO/TiO$_2$ of 45/55 was fixed at 0. Output measurement was done using a fixed magnetic head type drum tester, while the relative speed between the magnetic heads and the magnetic tape and the frequency were set to 20 m/s and to 40 MHz, respectively.

The experimental results are shown in Tables 2 and 3 for the Ni amounts of 10 mol % and 30 mol %, respectively.

TABLE 2

| CaO/TiO2 (Molar Ratio) | 10/90 | 20/80 | 30/70 | 40/60 | 45/55 | 50/50 | 55/45 |
|---|---|---|---|---|---|---|---|
| Comparison Output | −3.0 dB | −1.5 dB | −1.1 dB | −0.5 dB | 0 dB | +0.6 dB | — |
| Thermal Expansion Coefficient (×10$^{-7}$/°C.) [100–550° C.] | 95 | 100 | 104 | 107 | 114 | 121 | — |
| Pore Ratio | <0.1% | <0.1% | <0.1% | <0.1% | <0.1% | <0.1% | >30% |

TABLE 3

| CaO/TiO2 (Molar Ratio) | 10/90 | 20/80 | 30/70 | 40/60 | 45/55 | 50/50 | 55/45 |
|---|---|---|---|---|---|---|---|
| Comparison Output | −3.0 dB | −2.0 dB | −1.3 dB | −0.1 dB | +0.6 dB | +1.0 dB | — |
| Thermal | 94 | 98 | 103 | 114 | 120 | 124 | — |

TABLE 3-continued

| | | | | | | | |
|---|---|---|---|---|---|---|---|
| Expansion Coefficient ($\times 10^{-7}/°C.$) [100–550° C.] | | | | | | | |
| Pore Ratio | <0.1% | <0.1% | <0.1% | <0.1% | <0.1% | <0.1% | >30% |

If the proportion of CaO in the molar ratio $CaO/TiO_2$ is less than 30, that is if the proportion of $TiO_2$ is larger than 70, the thermal expansion coefficient becomes smaller and the output is lowered. On the other hand, if the proportion of CaO in the molar ratio $CaO/TiO_2$ becomes larger than 50, that is if the proportion of $TiO_2$ is lower than 50, the pore ratio is increased, such that the material becomes hardly usable as the guard material. Thus it is seen that a material having a molar ratio $CaO/TiO_2$ ranging between 30/70 and 50/50 is preferred.

It is seen from above that the layered magnetic head having a non-magnetic substrate 11, mainly composed of CaO, $TiO_2$ and NiO, with the molar ratio $CaO/TiO_2$ ranging between 30/70 and 50/50 and with the NiO content being 5 to 30 mol %, as a guard material, has superior characteristics of high head efficiency and low partial abrasion.

Although the description has been made in the present Example 2 of a target material for sputtering having the composition of $Fe_{81}Ru_4Ga_{12}Si_3$ in terms of atomic percent, similar effects to those described above may similarly be obtained if the formed film has a composition of $(Fe_aRu_bGa_cSi_d)_xN_yO_zC_w$, where a, b, c, d, x, y and z denote the proportions of elements in atomic percent, where $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$ and $0 \leq w \leq 20$, with $a+b+c+d=100$ and $x+y+z+w=100$.

The magnetic metal films 6 and 7 may also be formed of a material mainly composed of Fe and containing at least one element selected from among Ru, Ga, Si, O and N, in addition to the above-mentioned FeRuGaSi alloy.

Although the laminated magnetic films 4 and 5 are formed in the present Example by a dc magnetron sputtering device and a high frequency sputtering device, similar effects to those described above may also be obtained by other devices excellent in film thickness controlling properties, using the vacuum thin film forming techniques, such as sputtering, vacuum deposition, ion plating or ion beam methods.

Furthermore, although the guard material in the above Example is formed by the non-magnetic substrate 11 mainly composed of CaO, $TiO_2$ and NiO, with the molar ratio $CaO/TiO_2$ ranging between 30/70 and 50/50 and with the amount of NiO being 5 to 30 mol %, similar effects to those described above may also be obtained if the guard piece 11 is designed as a composite substrate formed of plural layers of two or more materials joined together, as shown in FIG. 5.

The similar effects to those described above may also be obtained if the laminated magnetic films 4, 5 are mounted with a pre-set azimuth angle instead of at a position perpendicular to the magnetic gap G, as shown in FIG. 8.

What is claimed is:

1. A magnetic head comprising magnetic core halves each comprising a magnetic metal film sandwiched between a pair of guard pieces, said magnetic core halves being abutted with end faces of the magnetic metal films facing each other, with a magnetic gap being defined between abutting surfaces of the magnetic metal films, with said guard pieces being formed of a non-magnetic material for a magnetic head consisting of 15 to 45 mol % CaO, 40 to 80 mol % $TiO_2$ and 5 to 30 mol % NiO and wherein the molar ratio of $CaO/TiO_2$ is from about 30/70 to about 50/50.

2. The magnetic head as claimed in claim 1, wherein each of the guard pieces comprise a composite material formed by adjoining layers of two or more different materials, a portion of each guard piece defining a sliding contact surface for slidably contacting a magnetic recording medium, each said portion being a non-magnetic material consisting of 15 to 45 mol % CaO, 40 to 80 mol % $TiO_2$ and 5 to 30 mol % NiO and wherein the molar ratio of $CaO/TiO_2$ is from about 30/70 to about 50/50.

3. The magnetic head as claimed in claim 1, wherein said magnetic metal film is laminated magnetic films comprising plural unitary laminated magnetic films deposited with insulating films in-between, each unitary laminated magnetic film being made up of alternately laminated magnetic and non-magnetic films, said magnetic films being magnetostatically coupled to one another at end portions thereof.

4. The magnetic head as claimed in claim 3, wherein the magnetic films are mainly composed of Co and contain a least one of elements Zr, Mo, Nb, Ta, Ti, Hf and Pd.

5. The magnetic head as claimed in claim 3, wherein the magnetic films are mainly composed of Fe and contain a least one of elements Ru, Ga, Si, O and N.

6. A non-magnetic material for a magnetic head consisting of 15 to 45 mol % of CaO, 40 to 80 mol % of $TiO_2$ and 5 to 30 mol % of NiO, and wherein the molar ratio of $CaO/TiO_2$ is from about 30/70 to about 50/50.

* * * * *